(12) United States Patent
Avagliano et al.

(10) Patent No.: US 7,342,323 B2
(45) Date of Patent: Mar. 11, 2008

(54) SYSTEM AND METHOD FOR UPWIND SPEED BASED CONTROL OF A WIND TURBINE

(75) Inventors: Aaron Avagliano, Clifton Park, NY (US); James Patrick Francis Lyons, Niskayuna, NY (US); Corneliu Barbu, Guilderland, NY (US); Shashikanth Suryanarayanan, Mumbai (IN)

(73) Assignee: General Electric Company, Niskayuna, NY (US)

( * ) Notice: Subject to any disclaimer, the term of this patent is extended or adjusted under 35 U.S.C. 154(b) by 63 days.

(21) Appl. No.: 11/239,792

(22) Filed: Sep. 30, 2005

(65) Prior Publication Data

US 2007/0075546 A1    Apr. 5, 2007

(51) Int. Cl.
  *F03D 9/00* (2006.01)
  *H02P 9/04* (2006.01)
(52) U.S. Cl. .......................... 290/55; 290/44
(58) Field of Classification Search .................. 290/44, 290/43, 54, 55
  See application file for complete search history.

(56) References Cited

U.S. PATENT DOCUMENTS

| | | | | |
|---|---|---|---|---|
| 4,189,648 A | * | 2/1980 | Harner | 290/44 |
| 4,193,005 A | * | 3/1980 | Kos et al. | 290/44 |
| 4,420,692 A | * | 12/1983 | Kos et al. | 290/44 |
| 4,435,647 A | * | 3/1984 | Harner et al. | 290/44 |
| 4,695,736 A | * | 9/1987 | Doman et al. | 290/44 |
| 4,792,281 A | | 12/1988 | Coleman | 416/156 |
| 5,155,375 A | * | 10/1992 | Holley | 290/44 |
| 6,137,187 A | * | 10/2000 | Mikhail et al. | 290/44 |
| 6,420,795 B1 | * | 7/2002 | Mikhail et al. | 290/44 |
| 2004/0057828 A1 | | 3/2004 | Bosche | 416/1 |
| 2004/0183307 A1 | * | 9/2004 | Yoshida et al. | 290/44 |
| 2005/0276696 A1 | * | 12/2005 | LeMieux | 416/61 |
| 2006/0066111 A1 | * | 3/2006 | Suryanarayanan et al. | 290/44 |

* cited by examiner

*Primary Examiner*—Julio C. Gonzalez Ramirez
(74) *Attorney, Agent, or Firm*—Fletcher Yoder

(57) ABSTRACT

A method for controlling power output of a wind turbine generator in response to an anticipated change in wind speed is provided. The method includes sensing wind speed at a desired distance from the wind turbine generator in a direction of the wind. The method further includes controlling pitch of a blade of the wind turbine generator based upon sensed transient wind speed in advance of a change in wind speed at the wind turbine generator.

17 Claims, 4 Drawing Sheets

SYSTEM AND METHOD FOR UPWIND SPEED BASED CONTROL OF A WIND TURBINE

STATEMENT REGARDING FEDERALLY SPONSORED RESEARCH & DEVELOPMENT

This invention was made with Government support under Contract ZAM-7-13320-26 under Prime Contract DE-AC36-83CH10093.

BACKGROUND

The invention relates generally to wind turbines, and, in particular, to a system and method for controlling power output of a wind turbine generator during a wind gust, based upon upwind wind information, while reducing tower fore-aft and side-to-side moments.

Wind turbines are regarded as environmentally friendly and relatively inexpensive alternative sources of energy. A wind turbine generator generally includes a wind rotor having a plurality of blades that transform wind energy into rotational motion of a drive shaft, which in turn is utilized to drive a rotor of an electrical generator to produce electrical power. In modem wind power generation systems, power output from a plurality wind turbine generators, comprising a "wind farm", is typically combined for transmission to the grid.

Power output of a wind turbine generator generally increases with wind speed until a rated power output is reached. Thereafter, the power output is usually maintained constant at the rated value even with an increase in wind speed. This is generally achieved by regulating the pitching action of the blades in response to an increase in wind speed. With increase in wind speed beyond the rated power output, the blades generally are pitched toward feather (i.e., twisted to be more closely aligned with the direction of the wind), thereby controlling the angular speed of the rotor. As a result, generator speed, and consequently, generator output may be maintained relatively constant with increasing wind velocities.

In case of sudden gusts, wind speed may increase drastically in a relatively small interval of time. Maintaining the power output of the wind turbine generator constant during such sudden gusts calls for relatively rapid changes of the pitch angle of the blades. However, there is typically a time lag between the occurrence of a gust and the actual pitching of the blades based upon dynamics of the pitch control actuator and the inertia of the mechanical components. As a result, generator speed, and hence power, may increase considerably during such gusts, and may exceed the maximum prescribed power output level (also known as overspeed limit) causing the generator to trip, and in certain cases, the wind turbine to shut down. The overspeed limit is generally a protective function for the particular wind turbine generator and is based upon fatigue considerations of the mechanical components, such as the tower, drive train, and so forth. Moreover, sudden gusts may also significantly increase tower fore-aft and side-to-side bending moments due to increase in the effect of wind shear.

Accordingly, there exists a need for an improved mechanism to control pitching of the blades of a wind turbine to maintain power output of the generator during heavy gusts, while reducing tower fore-aft and side-to-side moments.

BRIEF DESCRIPTION

Briefly, in accordance with one aspect of the present invention, a method is provided for controlling power output of a wind turbine generator in response to an anticipated change in wind speed. The method includes sensing wind speed at a desired distance from the wind turbine generator in a direction of the wind. The method further includes controlling pitch of a blade of the wind turbine generator based upon sensed transient wind speed in advance of a change in wind speed at the wind turbine generator.

In another aspect, the present invention provides a wind turbine generator having a plurality of blades mounted on a rotor drivingly coupled to an electrical generator. The wind turbine generator includes upwind wind speed measurement sensor adapted to sense wind speed at a desired distance from the wind turbine generator in a direction of the wind. The wind turbine generator further includes a pitch control system configured to control pitch of a blade of the wind turbine generator based upon sensed transient wind speed in advance of a change in wind speed at the wind turbine generator.

In still further aspects, computer programs and routines are provided comprising code adapted to implement the above described functionality.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The following description presents a novel technique for controlling power output of a wind turbine generator during sudden changes in wind speed, such as during a gust by maintaining the generator speed within the overspeed limit (or protective threshold) during such gusts, thus preventing tripping or shutdown of the wind turbine generator during wind gusts. Embodiments of the present technique provide a control oriented sensing methodology to obtain wind speed information using upwind wind measurement sensors and a set of control algorithms that process the upwind wind speed information to generate a collective blade pitch command to pitch the wind turbine blades ahead in time when a wind gust occurs, thereby resulting in increased wind energy capture and reduced dynamic loads on the wind turbine structure. Embodiments of the present technique are described in detail below referring generally to FIGS. 1-7.

Figure 1:
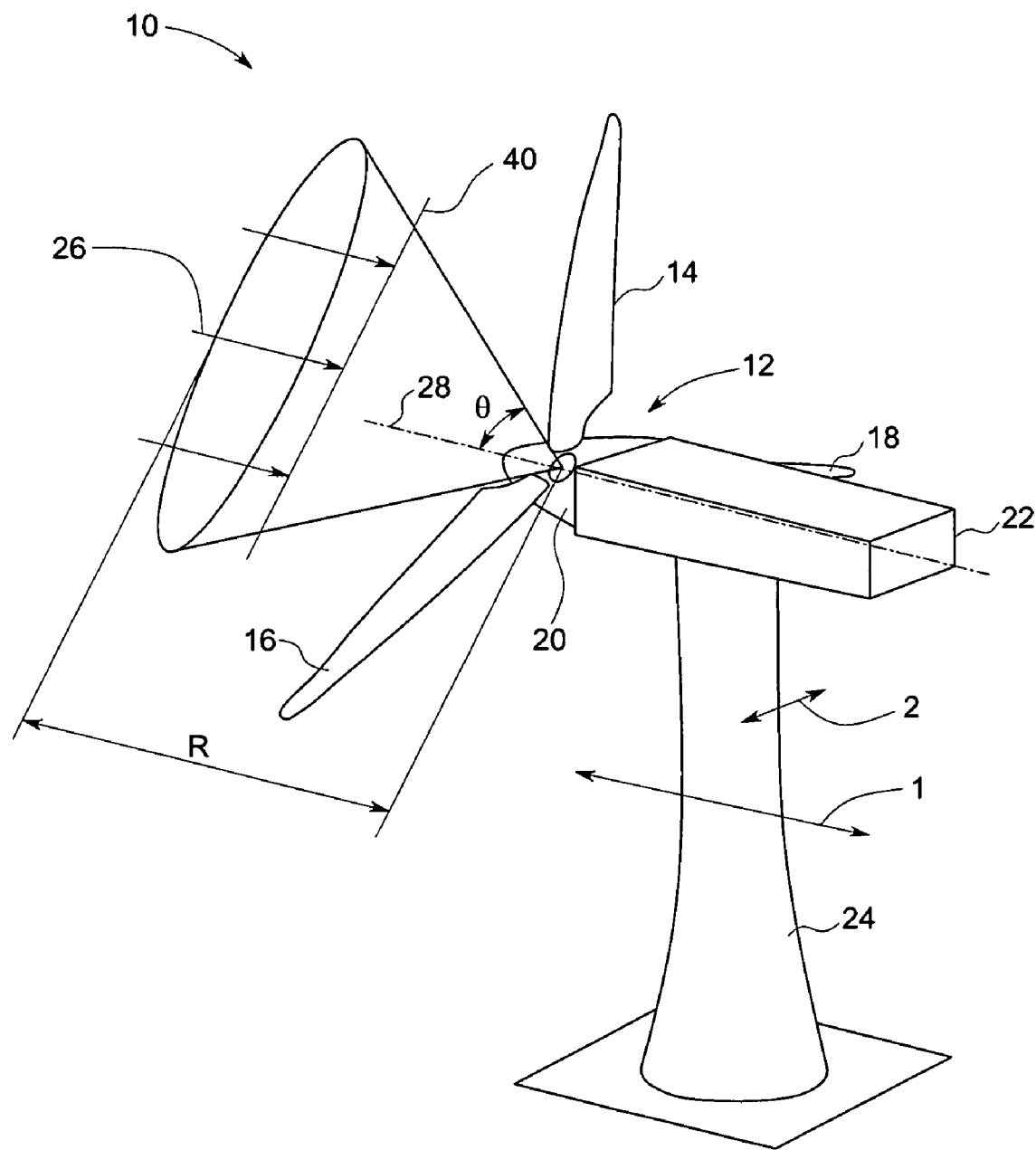
FIG. 1 illustrates a wind turbine generator in accordance with aspects of the present technique.

Turning now to the drawings, FIG. 1 illustrates a wind turbine generator 10 in accordance with aspects of the present technique. The wind turbine generator 10 comprises a rotor 12 having a plurality of wind turbine blades 14, 16, 18 mounted on a hub 20. The wind turbine generator 10 also comprises a nacelle 22 that is mounted atop a tower 24. The rotor 12 is drivingly coupled to an electrical generator via drive train (not shown) housed within the nacelle 22. The tower 24 exposes the blades 14, 16, 18 to the wind (directionally represented by arrow 26), which causes the blades 14, 16, 18 to rotate about an axis 28. The blades 14, 16 and 18 transform the kinetic energy of the wind into a rotational torque, which is further transformed into electrical energy via an electrical generator.

Figure 2:
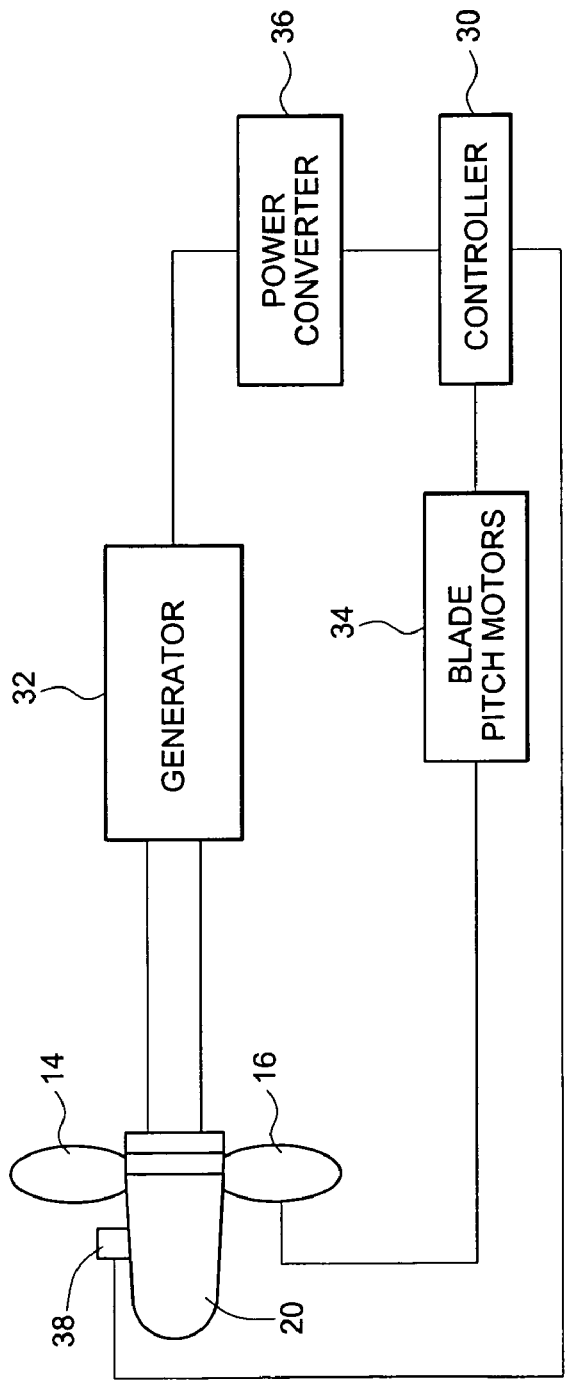
FIG. 2 illustrates the functional elements of the wind turbine generator in accordance with aspects of the present technique.

FIG. 2 is a block diagram of the functional elements of the wind turbine generator 10 according to aspects of the present technique. As illustrated, the blades of the wind turbine generator 10 drive an electrical generator 32. The wind turbine generator 10 further comprises a controller 30 configured to control electrical power output of the generator 32 based upon sensed wind speed. Power output of the electrical generator 32 may be controlled via controlling the pitch of the blades via blade pitch motors 34. Controlling air-gap torque of the generator 32 via one or more power converters 36 may also simultaneously control power output of the generator.

For low wind velocities, an increase in speed of the wind causes an increase in the rotational speed of the blades 14, 16, 18, and consequently, the electrical power output of the generator 32. In certain embodiments, electrical power output is allowed to increase with wind speed until a rated power output level is reached. With further increase in wind speed, the power output of the generator 32 is maintained substantially constant. This is achieved by pitching one or more of the blades 14, 16, 18 toward feather. In this discussion, pitching refers to twisting the wind turbine blade to change the angle of attack of wind on the blade. Pitching toward feather implies twisting of the blade such that the blade surface is aligned along direction of the wind speed 26 (i.e., reducing the angle of attack). Pitching a blade toward feather leads to a decrease wind energy capture by the blade. Hence, with increase in the wind speed, the blades are progressively pitched towards feather, to maintain a substantially constant generator speed, and consequently, a steady generator power output.

As mentioned above, in case of sudden gusts, wind speed may increase in a relatively small interval of time. In accordance with aspects of the present technique, in order to compensate for time lag of the blade pitch motors 34 and maintain a constant power output of the wind turbine generator 10 during such sudden gusts, or at least a relatively smooth or controlled change in output, the blades are preemptively pitched before gust hits the turbine, thereby preventing the generator 32 from reaching its overspeed limit upon occurrence of a gust. To implement this preemptive pitching, wind speed is sensed upwind of the blades 14, 16, and 18 via upwind wind speed measurement sensors 38. In the illustrated embodiment, the sensors 38 include a light detection and ranging device, also referred to as LIDAR. Referring back to FIG. 1, the LIDAR 38 is a measurement radar which is configured to scan an annular region around the wind turbine generator 10 and measure wind speed based upon reflection and/or scattering of light transmitted by the LIDAR from aerosol. The cone angle ($\theta$) and the range (R) of the LIDAR 38 may be suitably selected to provide a desired accuracy of measurement as well as an acceptable sensitivity. In the illustrated embodiment, the LIDAR 38 is located on the hub 20 whereupon the blades 14, 16, 18 are mounted. In certain alternate embodiments, the LIDAR 38 may also be located around the base of the wind turbine tower 24.

In accordance with aspects of the present technique, the LIDAR 38 is configured to measure wind speed ahead of at least one specific portion, typically the most significant sections of the blades 14, 16, 18 in terms of contributions of those sections to aerodynamic torque on the blades. These sections may include, for example, sections close to the tip of the blade. The points ahead of the blades 14, 16, 18 at which wind speed is measured by the LIDAR 38 is represented by a plane 40.

As illustrated in FIG. 2, the upwind wind speed sensed by the LIDAR 38 is utilized by the controller 30 to determine a collective pitch command ($C_P$), which is implemented into an actual change in pitch of the blades by the blade pitch motors 34. The control mechanism implemented by the controller 30 is described in greater detail below.

Figure 3:
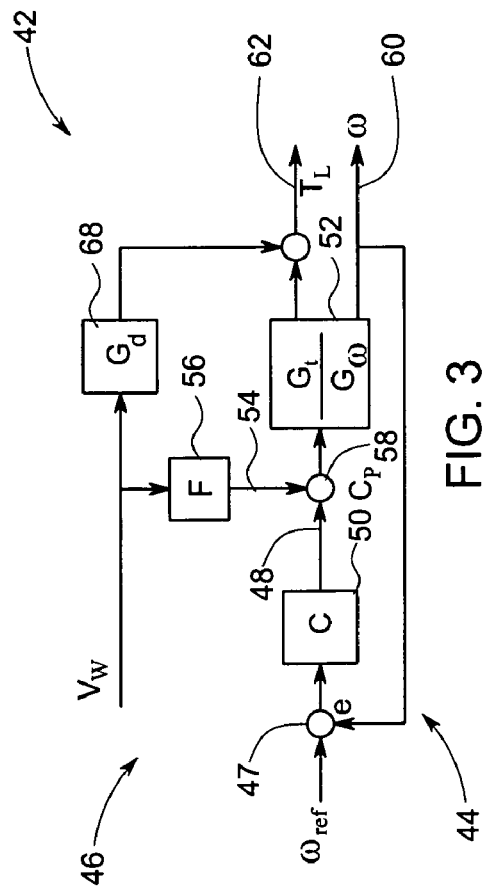
FIG. 3 is a schematic diagram illustrating a control strategy to implement collective blade pitch control in accordance with aspects of the present technique.

FIG. 3 is a schematic diagram illustrating an exemplary control mechanism 42 to implement collective blade pitch control in accordance with aspects of the present technique. The control mechanism 42 incorporates a feedback control system 44 and a feed forward control system 46. The feedback control system 44 is configured to determine an error (e) between a reference (desired) generator speed ($\omega_{REF}$) and the actual generator speed ($\omega$) at summation point 47. The error (e) is then subject to a gain C at block 50 to generate an output 48 indicative of a required change in blade pitch angle to reduce the error (e) between $\omega$ and $\omega_{REF}$. At block 52, the effect of changing the blade pitch on dynamics of the tower 24 and the generator 32 are separated to determine the actual generator speed ($\omega$) 60 and the tower load ($T_L$) 62 via gains $G\omega$ and $G_t$ respectively. The gain $G\omega$ is based upon dynamics of the generator 32, while the gain $G_t$ is indicative of a transfer function of the tower 24. As will be appreciated, the output 48 of the feedback control system 44 is configured to cause a decrease in blade pitch angle when the generator speed ($\omega$) exceeds the reference speed ($\omega_{REF}$), and an increase in blade pitch angle when the generator speed ($\omega$) is lesser than the reference speed ($\omega_{REF}$). Thus, under normal operation of the wind turbine generator 10, the output 48 acts upon the blade pitch motors 34 such that the generator speed is maintained at a constant reference level, and the error (e) approaches zero.

The feed forward system 46 utilizes the upwind wind speed information ($V_W$) from the LIDAR 38 and generates an output 54 that is configured to cause the blades to pitch in advance of a sudden change in wind speed. The feed forward system 46 incorporates a gain F on the wind speed data ($V_W$) at block 56 to produce the output 54. The output 54 of the feed forward control system is summed up at junction 58 with the output 48 of the feedback control system 44 to produce a collective blade pitch command ($C_P$). In one embodiment, this gain F is directly proportional to the term $G_d G_t^{-1}$, wherein $G_d$ is based upon the influence of wind speed on tower dynamics. Thus, during a gust, the sudden change in the wind speed is sensed upwind of the blades, causing an increase in the output 54 of the feed forward system 46, and consequently, an increase in the collective pitch command ($C_P$). This in turn causes the blade pitch motors 34 to pitch the blades before the gust actually reaches the wind turbine generator 10. The technique thus ensures that the power output of the generator is reduced gradually and that the generator speed does not exceed the overspeed limit that would cause it to trip. In certain embodiments, the gain F may be further proportional to the sensed wind speed, such that stronger the gust, faster is the response of the feed forward system 46 to increase the collective blade pitch command ($C_P$).

Figure 4:
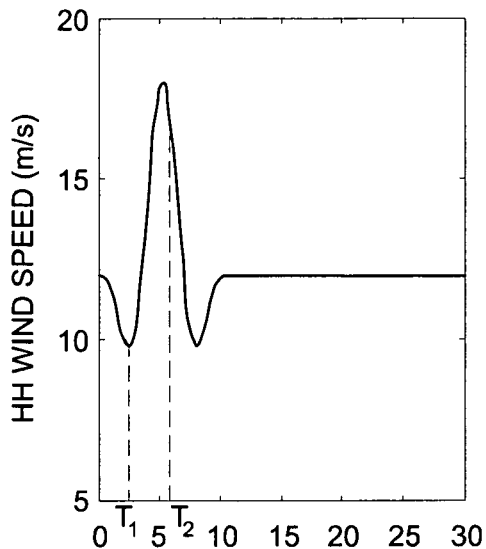
FIG. 4 is a graphical representation of time variation of hub-height wind speed during occurrence of a gust.
Figure 5:
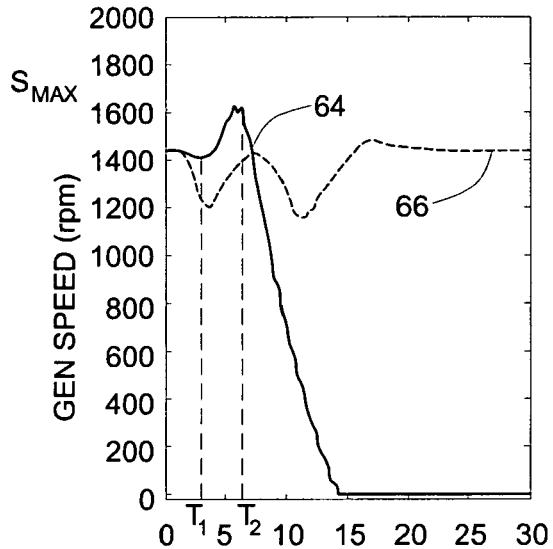
FIG. 5 is a graphical representation of time variation of generator speed during occurrence of a gust, in accordance with aspects of the present technique.

FIG. 4 is a graphical representation illustrating an exemplary variation of wind speed (represented along a Y-axis) with time (represented along an X-axis) during a gust. As illustrated, at time $T_1$ the wind speed increases sharply until it reaches a maximum value at time $T_2$, after which the wind speed falls rapidly. FIG. 5 represents an exemplary variation in generator speed during such a gust. Trace 64 represents the variation in generator speed without preemptive pitching of the blades while trace 66 represents the corresponding variation with preemptive pitching of the blades using the present upwind wind speed measurement technique. As can be seen, without preemptive pitching, the generator speed starts increasing upon occurrence of the gust, and exceeds its overspeed limit ($S_{max}$) at about time $T_2$, when the wind speed reaches a maximum value, causing it to trip. Thereafter, the generator shaft continues to rotate due to inertia and the generator speed rapidly falls to zero. However, with preemptive pitching, such a situation is avoided. As illustrated, the blades are pitched before the gust actually reaches the wind turbine generator, such that speed increases gradually during the gust and is maintained constant at rated value after the gust has elapsed.

Figure 6:
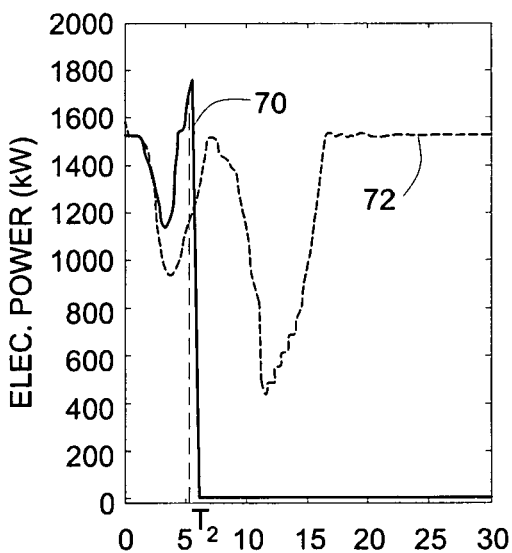
FIG. 6 is a graphical representation of time variation of generator electrical power output during occurrence of a gust, in accordance with aspects of the present technique.

FIG. 6 illustrates an exemplary variation of electrical power output during a gust. Here trace 70 represents the variation in case of a conventional pitching mechanism while trace 72 represents variation caused by utilizing aspects of the present technique. As illustrated, in case of conventional pitching, the generator output drops to zero as soon as the generator speed exceeds the overspeed limit. However, using the present technique, the generator power output rides through the gust and is restored to a constant rated value thereafter.

Figure 7:
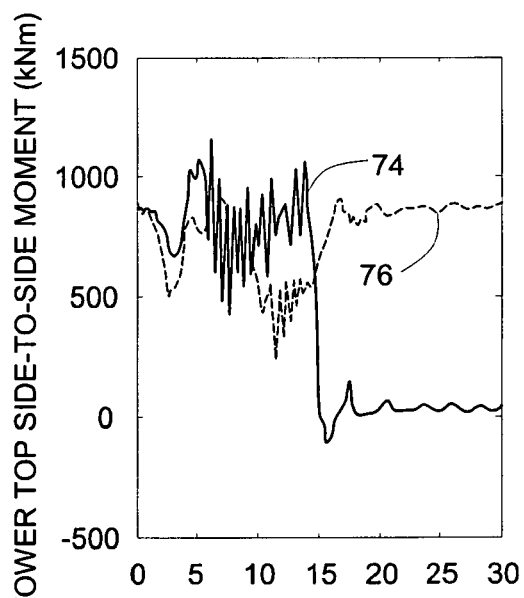
FIG. 7 is a graphical representation of time variation of tower side-to-side moment during occurrence of a gust, in accordance with aspects of the present technique.

Change in wind speed further causes increased tower fore aft and side-to-side oscillations because of increased wind shear effect. This is because, at any given instant, different blades are at different heights, and hence are subject to varying wind speeds (since wind speed varies with height), leading to periodic oscillations of the tower in a fore-aft direction (indicated by arrow 1 in FIG. 1) as well as in a side to side direction (indicated by arrow 2 in FIG. 1). The present technique leads to reduced tower fore-aft and side to side oscillations by pitching the blades toward feather in advance of an imminent gust, leading to reduced bending moments on the blades 14, 16, 18 and hence on the tower 24. The load on the tower due to an increase in wind speed may be determined at block 68 via again $G_d$ based upon influence of wind speed on tower dynamics, which is summed up to obtain the total tower load ($T_L$). An exemplary variation of tower loads during occurrence of a gust is illustrated in FIG. 7, wherein trace 74 represents tower load variation without preemptive pitching and trace 76 represents the variation with the present pitching technique using upwind wind speed information.

Figure 8:
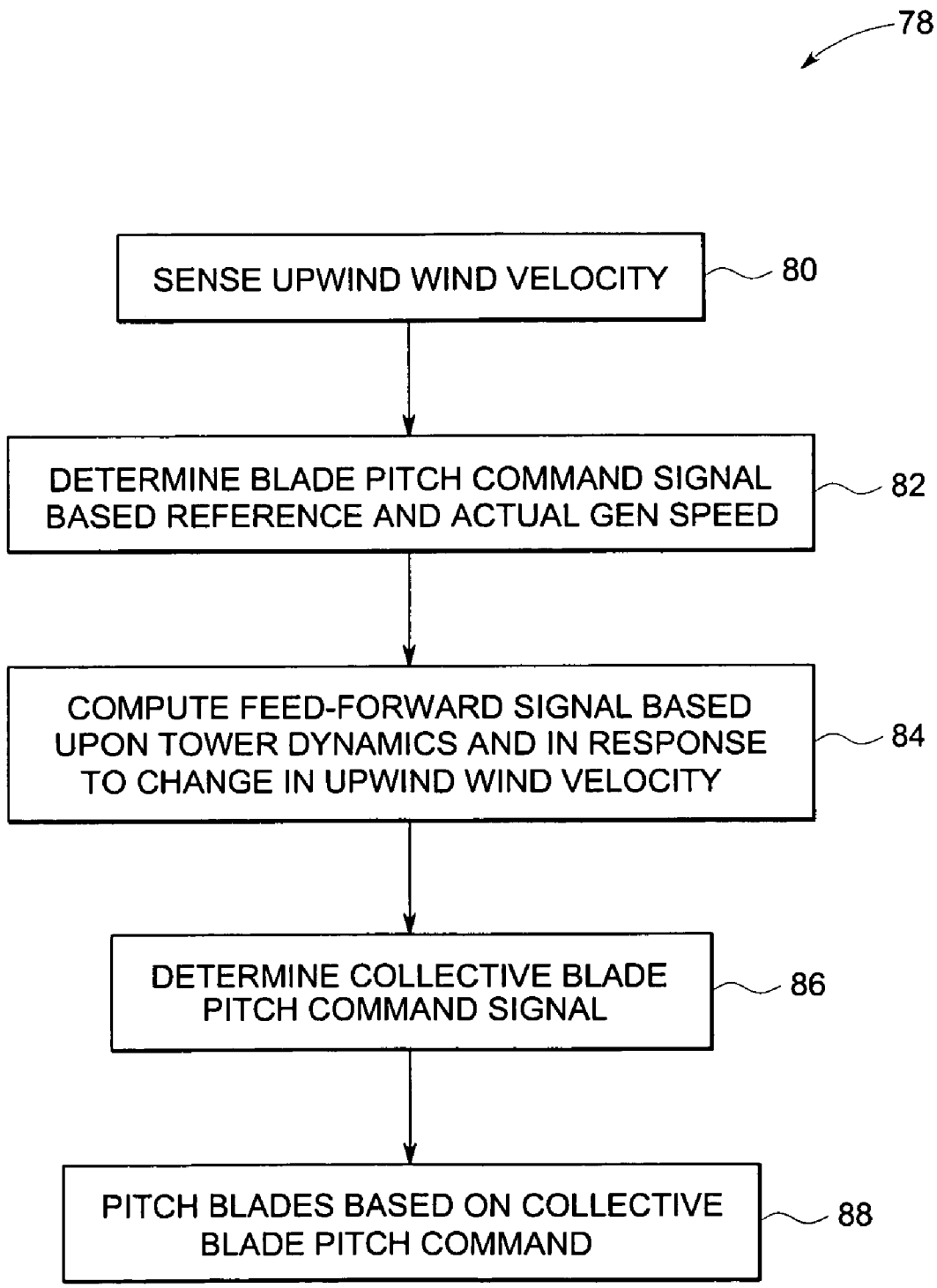
FIG. 8 is a flowchart illustrating an exemplary method of controlling collective blade pitch in accordance with aspects of the present technique.

FIG. 8 is a flowchart illustrating an exemplary method 78 for controlling power output of a wind turbine generator in accordance with aspects of the present technique. The method 78 begins by sensing upwind wind speed (block 80). As mentioned earlier, block 80 may incorporate use of a LIDAR to sense wind speed ahead of the most significant sections of the blades in terms of aerodynamic torque to determine sudden changes in wind speed. At block 82, a blade pitch command is generated based upon a difference in actual generator speed and a referenced generator speed. Block 82 may incorporate a feedback control system as illustrated in FIG. 3 above. At block 84, a feed forward signal is generated based upon tower dynamics and change in upwind wind speed. The blade pitch signal and the feed forward signal are the summed to determine a collective blade pitch command (block 86). Next, at block 88, the blade pitch motors are actuated in response to the collective blade pitch command, to effect pitching of the blades in advance of a sudden change in wind speed.

The above-described techniques thus facilitate optimum use of upwind wind speed information to control fluctuations in power output of the wind turbine generator during sudden changes in wind speed, while reducing dynamic loads on the tower structure. As will be also appreciated, the above-described techniques may take the form of computer or controller implemented processes and apparatuses for practicing those processes. Aspects of the present technique may also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The techniques described may further be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling power output of a wind turbine generator in response to an anticipated change in wind speed, comprising:
   sensing wind speed at a desired distance from the wind turbine generator in a direction of the wind;
   determining a blade pitch command signal based upon a difference between a reference generator speed and actual generator speed;
   determining a feed-forward signal based upon wind turbine tower dynamics, in response to the change in the sensed upwind wind speed, and coupling the feed-forward signal to the blade pitch command signal to obtain a collective blade pitch command signal; and
   controlling pitch of a blade of the wind turbine generator based upon sensed transient wind speed in advance of a change in wind speed at the wind turbine generator.

2. The method of claim 1, wherein sensing wind speed comprises sensing upwind wind speed via a light detection and ranging (LIDAR) device.

3. The method of claim 1, wherein sensing wind speed comprises sensing upwind wind speed ahead at least one specific portion of the blade based upon contribution of that section to aerodynamic torque on the blade.

4. The method of claim 1, comprising controlling generator speed via controlling of the pitch of the blade.

5. The method of claim 1, wherein the feed-forward signal is determined via a gain based upon tower dynamics and generator dynamics.

6. The method of claim 5, wherein the feed-forward signal is further based upon the sensed wind speed.

7. A method for controlling power output of a wind turbine generator in response to an anticipated change in wind speed, comprising:
    sensing upwind speed at a desired distance from the wind turbine generator in a direction of the wind;
    determining a feed-forward signal based upon wind turbine tower dynamics, in response to a change in the sensed upwind wind speed; and
    utilizing the feed-forward signal to determine a collective blade pitch command signal configured to control pitch of a wind turbine blade in advance of a change in upwind wind speed at the wind turbine generator.

8. The method of claim 7, wherein sensing upwind wind speed comprises sensing upwind wind speed via a light detection and ranging (LIDAR) device.

9. The method of claim 7, wherein sensing upwind wind speed comprises sensing upwind wind speed ahead at least one specific portion of the blade based upon contribution of that section to aerodynamic torque on the blade.

10. The method of claim 7, comprising controlling generator speed via controlling of the pitch of the blade.

11. The method of claim 7, wherein the feed-forward signal is determined via a gain based upon tower dynamics and generator dynamics.

12. The method of claim 7, wherein the feed-forward signal is further based upon the sensed wind speed.

13. A wind turbine generator, comprising:
    a plurality of blades mounted on a rotor drivingly coupled to an electrical generator;
    an upwind wind speed sensor configured to sense wind speed at a desired distance from the wind turbine generator in a direction of the wind;
    a feed-forward control system configured to determine a feed-forward signal based upon wind turbine tower dynamics, in response to the change in the sensed upwind wind speed, and coupling the feed-forward signal to a blade pitch command signal to obtain a collective blade pitch command signal; and
    a pitch control system configured to control pitch of a blade of the wind turbine generator based upon sensed transient wind speed in advance of a change in wind speed at the wind turbine generator, wherein the pitch control system is configured to control the pitch of the blade based upon a difference between a reference generator speed and actual generator speed.

14. The wind turbine of claim 13, wherein the upwind wind speed sensor comprises a light detection and ranging (LIDAR) device.

15. The wind turbine of claim 13, further comprising a feedback control system configured to determine a blade pitch command signal based upon the difference between the reference generator speed and actual generator speed.

16. The wind turbine of claim 13, wherein the feed-forward signal is determined via a gain based upon tower dynamics and generator dynamics.

17. The wind turbine of claim 13, wherein the feed-forward signal is further based upon the sensed wind speed.

* * * * *